Figure 1:
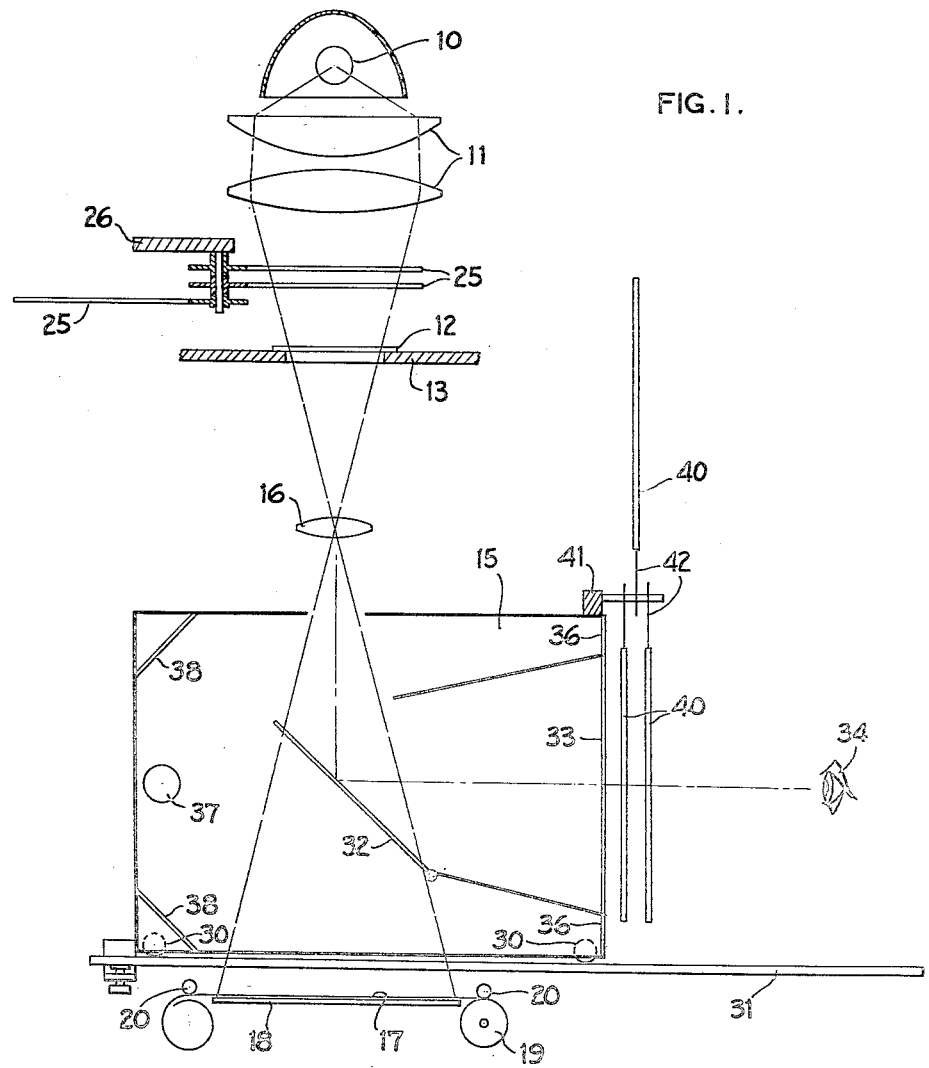

Nov. 13, 1945.   W. T. HANSON, JR   2,388,842
COLOR PRINTING SYSTEM
Filed Dec. 19, 1944   2 Sheets-Sheet 1

WESLEY T. HANSON, JR.
INVENTOR
ATTY & AG'T

Nov. 13, 1945. W. T. HANSON, JR 2,388,842
COLOR PRINTING SYSTEM
Filed Dec. 19, 1944  2 Sheets-Sheet 2
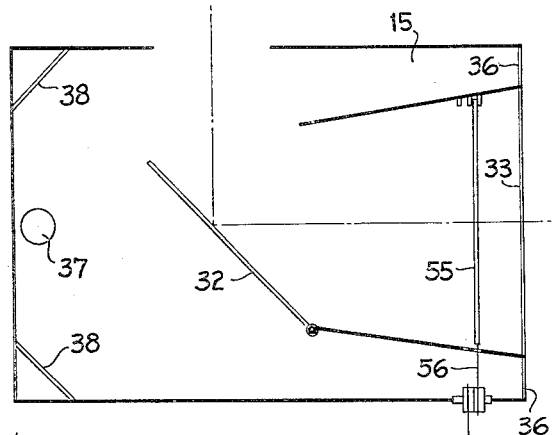
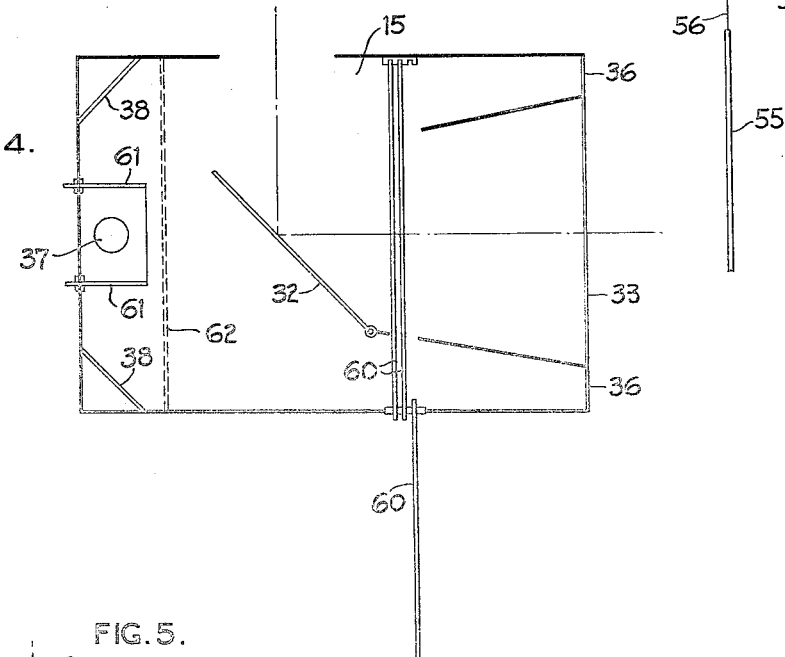
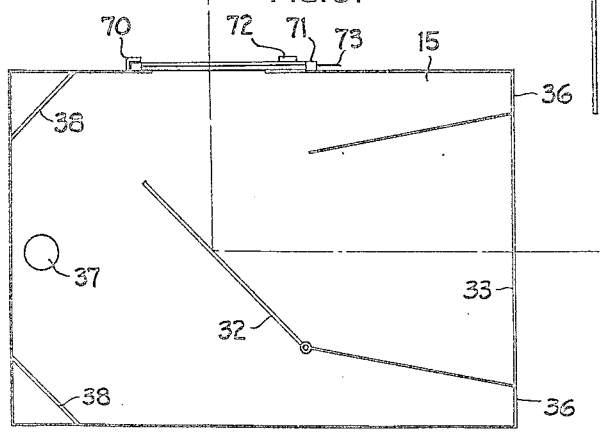
WESLEY T. HANSON, JR.
INVENTOR Patented Nov. 13, 1945

2,388,842

UNITED STATES PATENT OFFICE 2,388,842

COLOR PRINTING SYSTEM

Wesley T. Hanson, Jr., Oak Ridge, Tenn., assignor to Eastman Kodak Company, Rochester, N. Y., a corporation of New Jersey Application December 19, 1944, Serial No. 568,799

14 Claims. (Cl. 88—24)

This invention relates to projection printers and methods used in the making of colored prints from colored transparencies and it is most useful in printing from positive transparencies.

The invention is fundamentally an improvement over the color balancing feature described in U. S. Patent 2,256,385 which issued September 16, 1941, to R. M. Evans and B. E. Luboshez. In the system taught by that patent, an image similar to that used in exposing the color sensitive material is examined and compared to a white border surrounding the image. The color of the printing light is then adjusted, preferably ahead of the transparency so as to interfere least with the image formation, so as to give to the transparency being printed an over all hue which is apparently balanced with respect to the white borders. The Evans and Luboshez patent also suggests the inclusion of compensating filters in both the printing beam and the beam of light which illuminates the borders, the color of the compensating filter being selected to correct for the color balance of the particular roll of color sensitive material being printed. This of course changes the color temperature of the "white" borders with which the color balancing comparison is made, but it is well known that within reasonable limits the human eye and mind adjust themselves to ambient lighting conditions and can judge colors more or less independently of what white is used as standard.

However, I have found that there is a secondary but important difference or change in a person's ability to judge color balance when the color temperature at which the comparison is made, is changed. The present invention is based on this discovery and provides consistent results by permitting all comparisons to be made at one constant "white." Furthermore I have found that the judging is best when the borders specifically have an apparent white color of about 5400° K. color temperature. The primary object of the present invention is simply to provide a method and system for making the comparison at some constant color temperature, preferably about 5400° K. The system must be a convenient one if it is to be practical in production processes and for this reason it is not convenient to remove the compensating filter before each comparison is made and replace it in the printing beam after the comparison but before the actual exposing step. Also optical quality would suffer considerably if a filter were placed near the sensitive material which of course would be necessary if the compensation filter were to be located in the printing beam optically after the mirror which reflects the light to the viewing plane. Thus it is also an object of the invention to permit the comparison in question to be made at a constant color temperature with the compensating filter in the beam illuminating the transparency or near the image forming lens.

Generally speaking the invention involves a filter in the viewing beam and it is an object of one embodiment of the invention to allow this filter to extend, for convenience, over both the image and the adjacent comparison border. Thus according to the invention there is included in a color projection printer system means for holding in the printing beam, a color filter for compensating for the color balance of the photosensitive material as compared to the color of the illuminating means and, in the viewing and comparing system, means for holding a filter complementary to the compensating filter in the beam of the deflected image which is viewed. Preferably the border to be compared with this image is illuminated by means which give an apparent color temperature about 5400° K. (i. e. white). The complementary filter may be either between the viewing plane and the mirror which deflects the light to this viewing plane or it may be between the viewing plane and the eye. In the most preferred position it is part of the viewing system, removable therewith and is optically ahead of the mirror so as to be as near as possible to the image forming lens. In this embodiment the complementary filter is carried by whatever means is used for removing the mirror from the printing beam. In any of the embodiments in which this filter is only over the image the mounting for the filter preferably should be such that it interferes as little as possible with the light reaching and coming from the borders, but this is not too important since accurate comparisons can be made even with part of the border blocked off.

In one embodiment of the invention the complementary filter is arranged to extend over both the image and the borders which of course would by itself change the color temperature of the borders. In this embodiment the proper color temperature is maintained by including in the light beam which illuminates the borders a filter of exactly the same color as the compensating filter which is in the printer system.

In all embodiments in which the borders appear at 5400° K. color temperature, the compensation of the color balance of the sensitive material relative to the printing light should preferably be such that the final print is correctly balanced for viewing under "tungsten" illumination. If the prints are to be viewed under other conditions, the compensating filter may be somewhat different and the standard white for comparison may have some value other than 5400° K. color temperature.

In all embodiments of the invention, various mechanical arrangements may be provided for holding the complementary filter in the viewing beam and for allowing this filter to be changed whenever the compensating filter is changed.

While I prefer to employ a printer having all of the refinements described in the above mentioned Evans and Luboshez patent, the present invention is equally applicable to all forms of color printers and for clarity it is described below in connection with a printer from which all irrelevant details have been omitted. The invention will be fully understood from the following description when read in connection with the accompanying drawings in which:

Fig. 1 illustrates, partly schematically, a color printer incorporating the present invention.

Figs. 2, 3, 4, and 5 show alternative forms of the viewing system for use in the printer shown in Fig. 1.

In Fig. 1 light from a lamp 10 through condenser lens 11 illuminates a transparency 12 supported on a suitable mount 13. In the absence of the viewing system 15, light from the transparency 12 is focussed by a lens 16 on a sensitive material 17 mounted on an easel 18. The sensitive material is fed from a roll 19 across the easel 18 between rollers 20.

Between the condenser lens 11 and the transparency 12 means are provided for inserting color filters 25 for either of two purposes. One of these purposes is to compensate for the color sensitivity balance of the sensitive material 17. That is, the sensitivity balance of color sensitive material may vary slightly from one roll to the next and this may be corrected by including a suitable compensating filter in the illuminating beam. Such a filter should be between the source of illumination 10 and the transparency 12 since it might interfere with the optical quality of the image, if it were located between the transparency 12 and the sensitive material 17 near either of them. Of course it could be adjacent to the lens 16 and in some printers this is the most convenient location.

The other purpose of the filters 25 is to correct any lack of color balance in the original transparency 12. For example, if the original transparency 12 is definitely too bluish, a yellow filter could be included (in addition to the sensitivity compensating filter) to correct this error in the original, at least partially. In the arrangement shown the filters 25 are rotatably mounted on a support 26 so that any one or more of them may be alternatively positioned in or out of the printing beam. The color balancing filters and the sensitivity compensating filter may be mounted separately particularly as shown in the Evans and Luboshez patent mentioned above because the compensating filter (or its equivalent) stays in place as long as one particular roll of sensitive material is being used whereas the color balancing filters may have to be changed with each transparency that is to be printed. However, fundamentally such arrangements are all the same since means must be provided for holding both kinds of filters in the printing beam or one filter or set of filters may perform both purposes.

The printing beam is defined as including both the illuminating beam between the source 10 and the transparency 12 and the image forming beam between the transparency 12 and the sensitive material 17.

For viewing purposes a reflex system 15 is mounted on wheels 30 and tracks 31 so that it may be temporarily brought into the printing beam as shown. The printing beam is then deflected by a mirror 32 to form an image on a translucent screen 33 which may be viewed by the eye 34 of an observer. Adjacent to the viewing screen 33 and forming a border therearound is another translucent screen 36 illuminated by a light source 37 and reflectors 38. The color temperature of the illuminated means 37 is adjusted to give an apparent color temperature to the borders 36 equal to 5400° K. If there were no compensating filter in the printing beam, the observer would merely view the image on the screen 33 and adjust the filters 25 until the apparent over all hue of the image appeared proper in comparison with the 5400 degree white border. "White" is of course a relative term and can be specified exactly only by color temperature. However when a compensating filter (the term filter is used generically to include the cases where the desired color is obtained by using two or more filters superimposed) is included in the illuminating beam care must be exercised to avoid adding additional filters counteracting the compensating effect. Obviously if this were not taken into account the observer in selecting the best over all hue for the image on the screen 33 compared to the white border would automatically and inherently counteract the compensating filter thereby defeating its purpose.

According to the present invention filters 40 are rotatably carried on a support 41 so as to be alternatively positionable in and out of the viewing beam, but not in the printing beam. That is, these filters must be between the lens 16 and the eye 34 affecting the color of the image on the screen 33, but they must be part of the viewing system only and must not be in the printing beam during exposure. Furthermore the complementary filters must not interfere, in this embodiment, with the apparent color of the comparison borders. In the arrangement shown the individual supports 42 for the filters are relatively narrow so that the observer's view of the borders is obstructed only to a minimum degree.

With this complementary filter properly in place, the operator in adjusting the filters 25 no longer has any tendency to counteract the effect of the compensating filter. In fact, he can manipulate the filters 25 in any way convenient to get proper apparent color balance. It is even theoretically possible to end up with no filters in the light beam if the original were off hue exactly by an amount requiring the compensating filter to be removed i. e. by an amount requiring a filter to be added whose color is complementary to the compensation filter. For this reason no distinction exists between the mountings for the different filters 25. Any of them may be manipulated for color balance, once the "complementary" filter is in the viewing beam.

Figure 2:
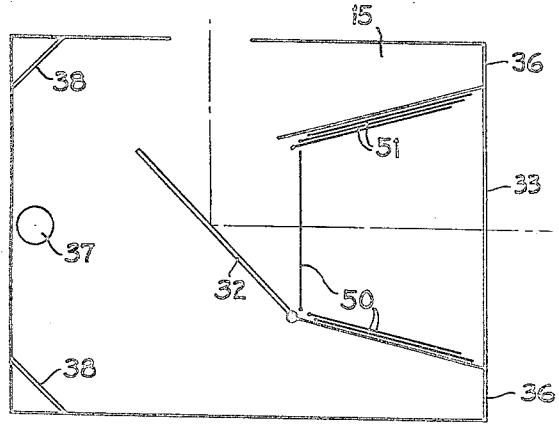

In Fig. 2 the filters which are to be selected to be complementary to the compensating filter are located as shown at 50 and 51, inside the reflex viewing box and are hingedly mounted so that one or more of them may be brought into the viewing beam between the mirror 32 and the screen 33. This may interfere slightly with the quality of the image but providing the filter thicknesses and inequalities are not so great as to interfere with focussing, this structure is not too critical since the image is used only for viewing. The arrangement shown in Fig. 1 of course has the advantage that the quality of the image which controls the focussing is not affected by the filters. This advantage disappears in printers in which correct focus is automatically assured anyway as in the Evans and Luboshez patent referred to above.

In Fig. 3 filters 55 are slidably mounted so as to be positionable between the mirror 32 and the viewing screen 33. The individual filter holders 56 must be so thin that the light reaching the borders 36 is not appreciably affected. However, as long as the mounts 56 are neutral in color, i. e. do not have any effect on the color of the borders 36 it is quite permissible to mask off a considerable portion of the border since this does not prevent the observer from making adequate color balance. The size of the support is kept to a minimum so as to present no annoying break in the border appearance. In the drawing the filters are shown as inserted from the bottom but in practice it is more convenient to insert them from the side or top.

In Fig. 4 an alternative embodiment is shown in which the complementary filters 60 are arranged to cover both the viewing beam between the mirror 32 and the screen 33 and the beam illuminating the borders 36. To bring the color temperature of the borders 36 back to the standard value, preferably 5400° K., filters 61 having a color equal to that of the compensating filter included in the printing beam, are mounted to surround the light source 37. Thus the filters 60 and 61 are complementary to each other with respect to a 5400° K. white and the borders 36 have a color temperature of 5400° K. It is often simpler to use a large single filter 62 in the position shown rather than four individual smaller filters 61 to surround the lamp 37, but obviously the effect is just the same. In fact the additional filter may be anywhere between the lamp 37 and the borders 36 or even between these borders and the eye provided the additional filter does not interfere with the light passing through the viewing screen 33. Similarly, the complementary filter made up of one or more of the filters 60 may be either optically ahead or optically after the screen 33 and borders 36. That is, the complementary filter may be in the position shown or between the screen 33 and the eye of the observer.

Fig. 5 shows the embodiment which I have found to be most convenient. In this case the "complementary" filter 71 is slid over the entrance window of the viewing box and is held there by a suitable channel 70 and cross band 72. As in Fig. 1, a number of such filters may be rotatably mounted on the side of the viewing box so as to be positionable over this entrance window. For example a suitable pivot may extend through the handle 73 of the filter and the channel 70 may be shaped to receive and hold the filter swung into place. One convenient trick which has been found useful is to keep together a group of low saturation, low density, differently colored filters which total to gray, to select the ones which give the color which compensates for paper sensitivity putting them in the printing beam and to leave the rest (which are automatically the complementary hue) in the viewing beam as filter 71.

The invention is exactly defined only by the following claims and is not limited to the structures described above.

I claim:

1. An optical system for printing from a color transparency including means for holding the transparency, means for illuminating the transparency, a lens for projecting an image of the transparency to an image plane, means for holding photosensitive material in said plane, means for holding color filter means in the printing beam for compensating for the color balance of the photosensitive material as compared to the color of the illuminating means, removable means for temporarily deflecting the image to a viewing plane for preliminary judging, means for illuminating the borders of the viewing plane with white light, and means for holding a filter complementary to said compensating filter in the beam of the deflected image.

2. A system according to claim 1 in which said border illuminating means gives the borders an apparent white color of about 5400° K. color temperature.

3. A system according to claim 1 in which said border illuminating means includes a filter of approximately the same color as said compensating filter and in which the last mentioned holding means in claim 1 holds the complementary filter over both the deflected image beam and the beam which illuminates the borders.

4. A system according to claim 1 in which the last mentioned holding means holds the complementary filter between the lens and the deflecting means only while said image is being deflected to the viewing plane.

5. A system according to claim 1 in which the last mentioned holding means holds the complementary filter behind the viewing plane between it and the deflecting means.

6. A system according to claim 1 in which the last mentioned holding means holds the complementary filter in front of the viewing plane in the deflected beam after it passes the viewing plane.

7. An optical system for printing from a color transparency including means for holding the transparency, means for illuminating the transparency, a lens for projecting an image of the transparency in an image plane, means for holding photosensitive material in said plane, means for holding color filter means in the printing beam for compensating for the color balance of the photosensitive material as compared to the color of the illuminating means, removable means for temporarily deflecting the image to a viewing plane for preliminary judging, means for illuminating the borders of the viewing plane with light of the same color as that through the compensating filter and means for holding a filter complementary to said compensating filter in both the beam of the deflected image and the border illuminating beam whereby the borders appear white.

8. A system according to claim 7 in which the complementary filter is complementary to the compensating filter at a color temperature of about 5400° K.

9. A system according to claim 7 in which the last mentioned holding means holds the complementary filter behind the viewing plane between it and the deflecting means.

10. A system according to claim 7 in which the last mentioned holding means holds the complementary filter in front of the viewing plane in the deflected beam after it passes the viewing plane.

11. An optical system for printing from a color transparency, including means for holding the transparency, means for illuminating the transparency, a lens for projecting an image of the transparency to an image plane, means for holding photosensitive material in said plane, removable means for temporarily deflecting the image to a viewing plane for preliminary judging, means for holding in the beam of the deflected image a filter complementary to the color of filter which would compensate for the color balance of the photosensitive material as compared to the color of the illuminating means, means for illuminating the borders of the viewing plane with white light, and means for holding color filters in the printing beam to correct the over all hue of the original as judged through the complementary filter in comparison with the white borders.

12. A system according to claim 11 in which said border illuminating means gives the borders an apparent white color of about 5400° K. color temperature.

13. An optical system according to claim 1 including additional color filter means for holding filters in the printing beam for correcting the apparent over all hue of the original as judged in comparison with the white borders.

14. The method of printing a color picture from a color transparency which comprises illuminating the transparency, forming an image of the transparency on a viewing screen substantially surrounded by white borders of about 5400° K. color temperature, placing a filter in the image forming beam which has a color complementary to the color which compensates for the color balance of the photosensitive material on which the print is to be made relative to the color of the illuminating means, placing color filter means in the light beam passing through the transparency, the color being selected to give a correct over all hue to the transparency as compared with said white borders and then exposing an area of said photosensitive material to an image of the original transparency by light of said illuminating means filtered by said color filter means but not filtered by said complementary filter.

WESLEY T. HANSON, Jr.